W. R. MALCOLM.
PROTECTING ARMOR FOR PNEUMATIC TIRES.
APPLICATION FILED JULY 2, 1909.

987,733.

Patented Mar. 28, 1911.

WITNESSES:

INVENTOR

Walter R. Malcolm
BY
Frederick W. Cameron, ATTY.

UNITED STATES PATENT OFFICE.

WALTER R. MALCOLM, OF ALBANY, NEW YORK.

PROTECTING-ARMOR FOR PNEUMATIC TIRES.

987,733.　　　　　Specification of Letters Patent.　　Patented Mar. 28, 1911.

Application filed July 2, 1909. Serial No. 505,550.

*To all whom it may concern:*

Be it known that I, WALTER R. MALCOLM, a citizen of the United States, residing at the city of Albany, in the county of Albany and State of New York, have invented certain new and useful Improvements in Protecting-Armor for Pneumatic Tires, of which the following is a specification.

Figure 1:
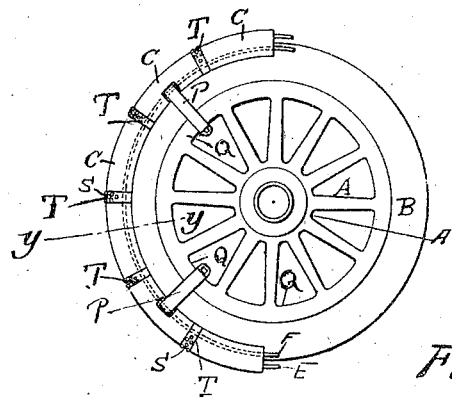
Figure 2:
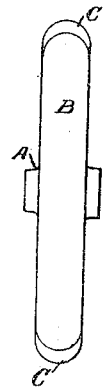
Figure 3:
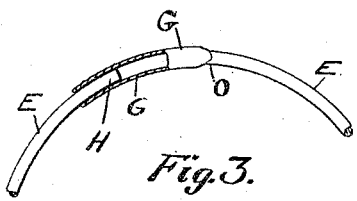
Figure 5:
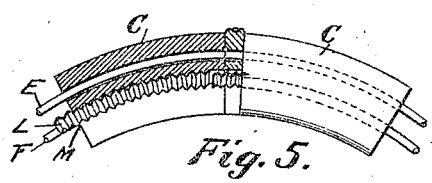
Figure 4:
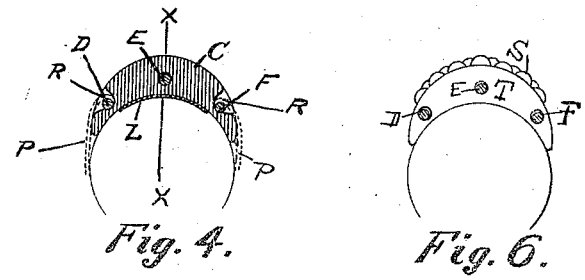
Figure 6:
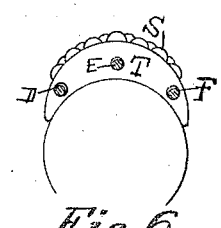

My invention relates to protecting armor for pneumatic tires, and the object of my invention is to provide a shoe or protecting armor particularly adapted for use on the pneumatic tires of automobile wheels, which armor is mounted in such a manner as to add to the resiliency of the wheel, with means for preventing creeping between the armor and the tire and means for securing the armor to the felly of the wheel, together with such other elements and combinations as are hereinafter more particularly described and claimed. I accomplish these objects by means of the mechanism illustrated in the accompanying drawings, in which:

Figure 1 is an elevation, with parts omitted, showing my invention attached to a wheel. Fig. 2 is an end elevation partly in section of a wheel provided with my invention. Fig. 3 is a view of a portion of one of the fastening rods. Fig. 4 is a cross section along the line Y—Y of Fig. 1. Fig. 5 is a transverse section along the line X—X on Fig. 4. Fig. 6 is a plan of a metallic section for preventing slipping.

Similar letters refer to similar parts throughout the several views.

On the wheel, A, is placed a pneumatic tire, B, which is usually, for preservation, protected by an armor or suitable covering, which I preferably construct of hard rubber, but it may be made of any suitable material. This armor is made up in a number of sections, C, C. These sections are threaded upon the rods or hoops, D, E and F. These rods are of sufficient length to enable the sections, C, C, when threaded thereon to encompass the tire B of the wheel A. The rods, E, are bent in the form of a hoop, the ends of each rod being slightly separated however, for the purpose of allowing the ends of the rods to approach or become more separated from each other, permitting a certain give to the sections, C, C, forming the armor. To one end, O, of the rod, E, Fig. 3, I secure by brazing, or otherwise, the enveloping tube, G, into which tube the loose end, H, of the rod, E, passes, which tube G covering the ends of the rod permits of the reciprocation therein of the loose end, H, of the rod for the purpose hereinbefore expressed. It is understood that each of the rods, D and F, are preferably provided with a like tube, G, to permit of movement between the ends of the rods.

Each section, C, is preferably provided on the inner side with a corrugated piece of metal, L, which may be fastened to the same, and which engages the tire B. I generally let the end of the corrugated metal, L, project slightly from one end of the section, as at M, leaving a corresponding opening, unprovided with the corrugated metal, at the other end of the section into which the projected end, M, of the engaging section is inserted. This will prevent the tire from being unprotected at the joints in case there is a sufficient give to cause a separation of the adjoining sections of the armor. The corrugated metal is securely fastened to the sections of the armor, and the armor is placed on the tires when the tires are not distended or pumped up. Therefore, after the corrugated metal on the armor is in position over the tires, and the tires are pumped up, the surface of the tires will project into the spaces between the projecting portions of the corrugations and thus prevent the creeping of the armor on the tire.

In order to thread the sections, C, C, on the rods, D, E and F, the rods are drawn out, the ends separated, pulled out of the tubes G and the sections are one by one threaded on to the rods.

In order to more securely hold the armor in position on the wheel I may use a clamp consisting of a piece of spring metal having a hook at each end adapted to engage with the rods D, and F, respectively, and extend in and around the felly, Q, of the wheel. Thus I have shown by dotted lines in Fig. 4 the metal strip, P, with the hooks, R, R, extending around the rods D and F respectively, and in Fig. 1 I show the clamp, P, passing around the felly, Q, as well as in contact with one of the rods. It is understood that I do not consider it necessary to place these clamps in connection with each of the sections, nor do I think that clamps are required under all circumstances.

For the purpose of preventing the slipping of the wheel I may use a metallic section, T, which may be threaded upon the rods, D and F, between the sections C, C. I corrugate or make uneven the surface, S, which preferably projects beyond the surface of the section, C, and which will obtain a hold and prevent the slipping of the wheel during the operation of the machine.

I do not intend to limit myself to the use of the section T, nor when it is used to the construction shown herein, as in many instances it is not necessary to have any device for preventing slipping, any more than it is customary at all times to use a chain on an automobile wheel.

A change in the manner of constructing my non-slipping section would not depart from my invention.

What I claim as my invention and desire to secure by Letters Patent is:

A pneumatic tire, rods bent to conform to the contour of said tire; a tube secured to one end of said rods, the other end adapted to reciprocate therein; a series of sections of tire covering threaded on said rods; a corrugated strip attached to said covering adapted to engage said tire; a clamp adapted to hold said covering in contact with said tire, substantially as described.

In testimony whereof I have affixed my signature in presence of two witnesses.

WALTER R. MALCOLM.

Witnesses:
  Jos. H. Girvin,
  Zeftran Bourcher.